Feb. 6, 1962 E. L. GRUENBERG 3,020,539
MODULATED CARRIER WAVE MOVING TARGET DETECTION RADAR SYSTEM
Filed March 24, 1958 4 Sheets-Sheet 1
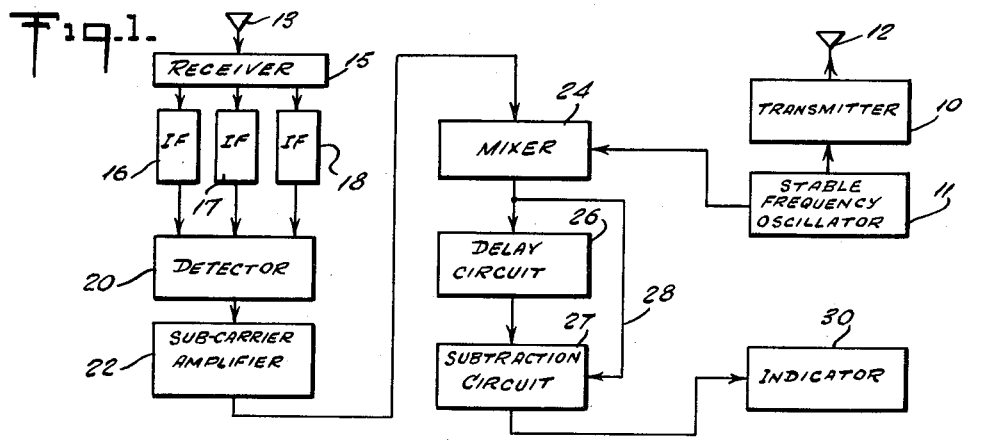
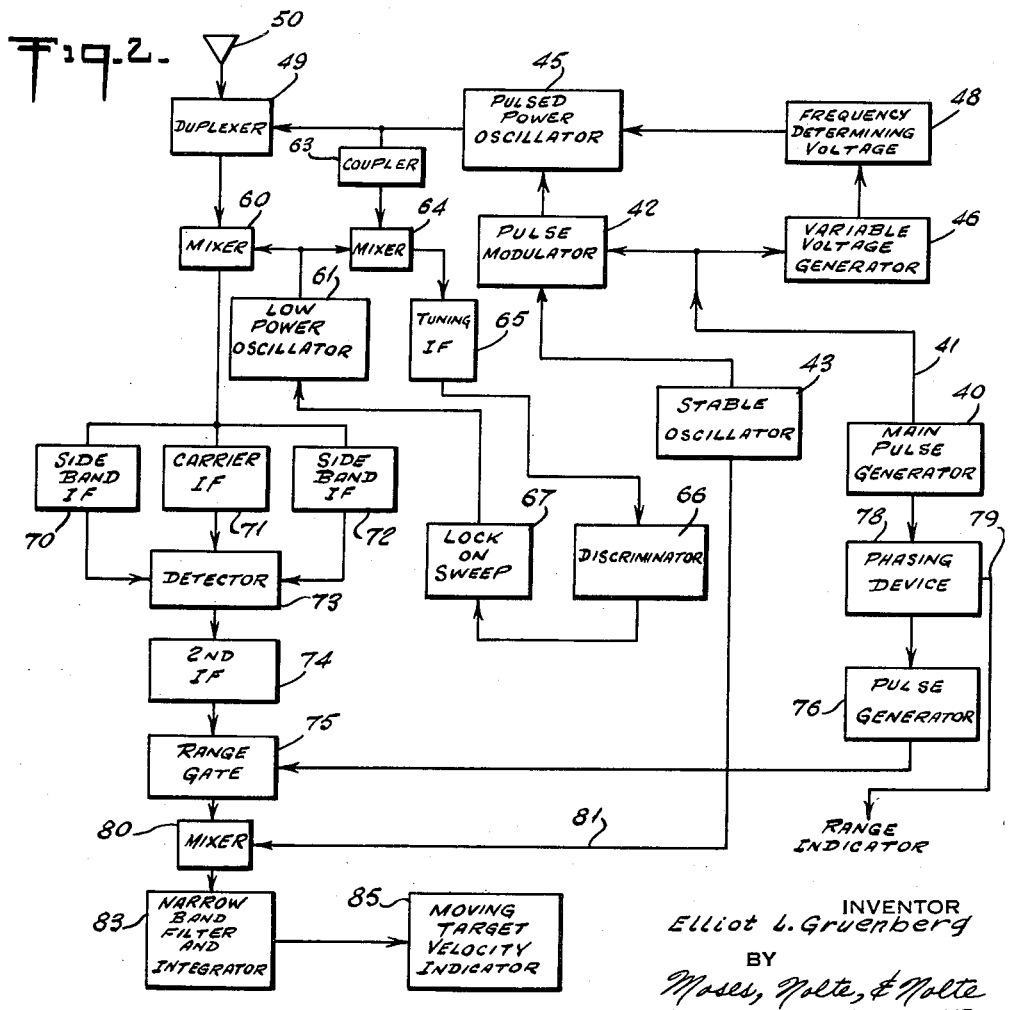
INVENTOR
Elliot L. Gruenberg
BY
Moses, Nolte, & Nolte
ATTORNEYS Feb. 6, 1962 E. L. GRUENBERG 3,020,539
MODULATED CARRIER WAVE MOVING TARGET DETECTION RADAR SYSTEM
Filed March 24, 1958 4 Sheets-Sheet 2
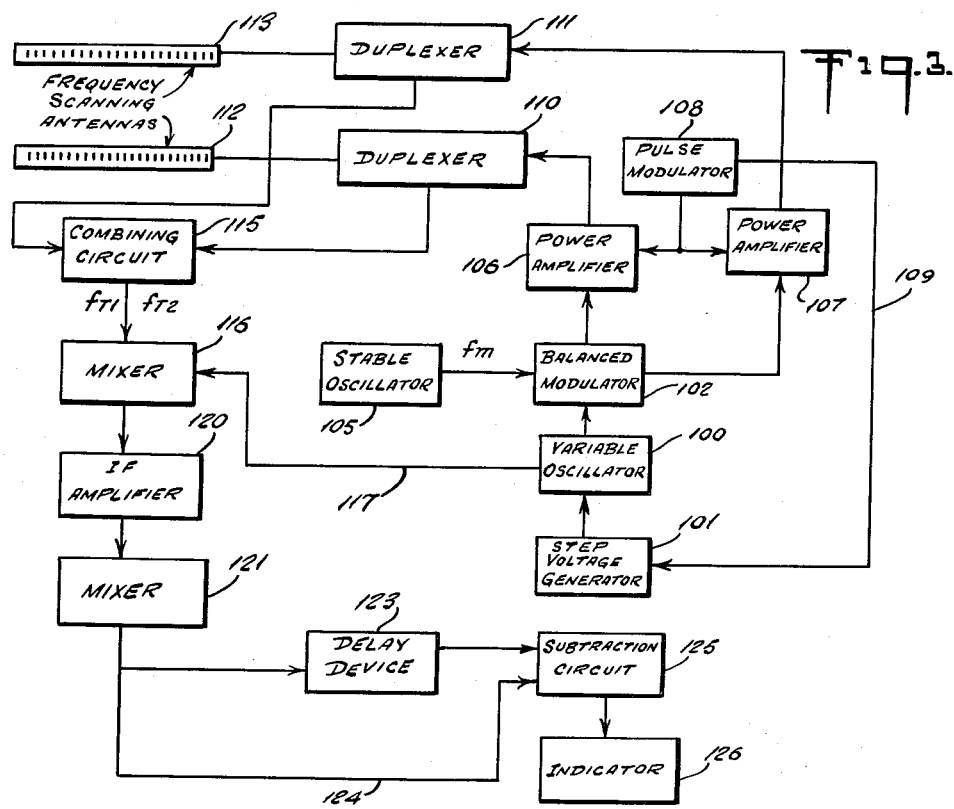
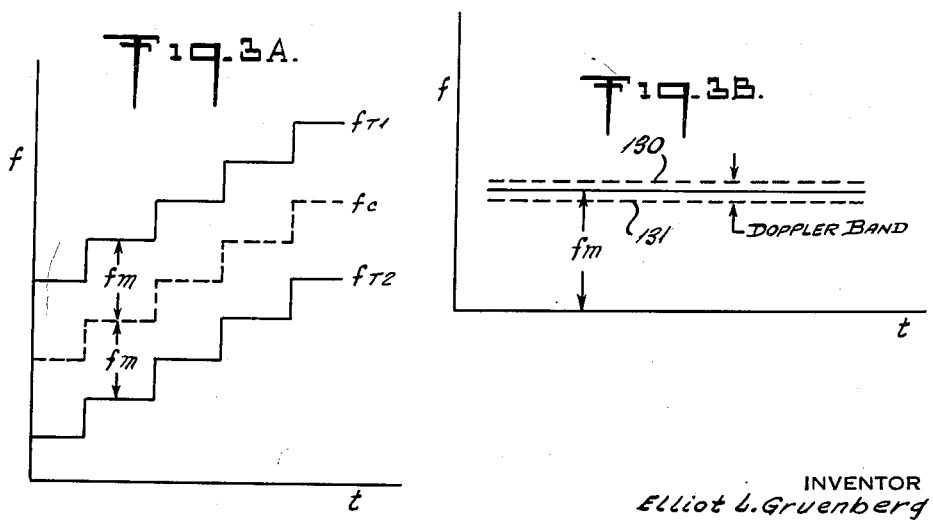
INVENTOR
Elliot L. Gruenberg
BY
Moses, Nolte, & Nolte
ATTORNEYS Feb. 6, 1962 E. L. GRUENBERG 3,020,539
MODULATED CARRIER WAVE MOVING TARGET DETECTION RADAR SYSTEM
Filed March 24, 1958 4 Sheets-Sheet 3
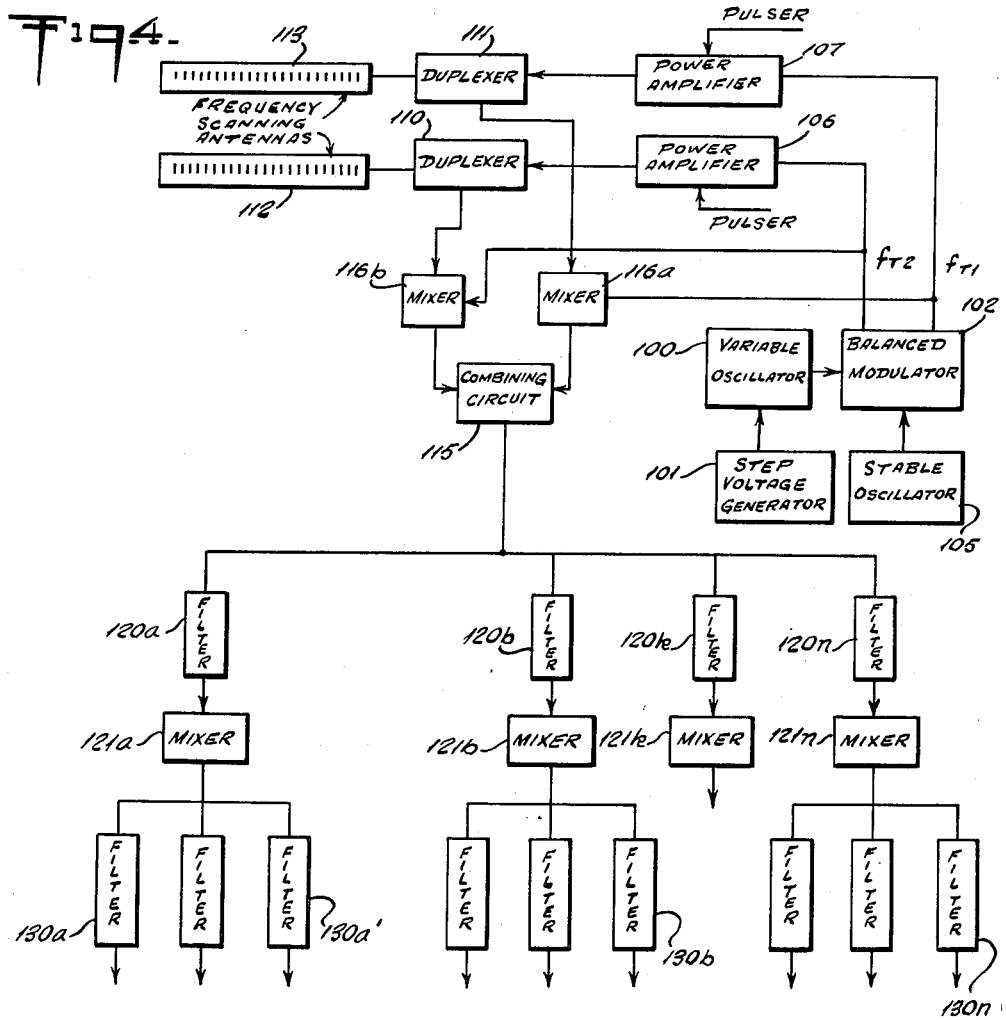
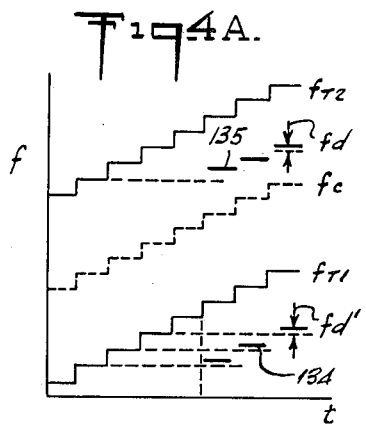
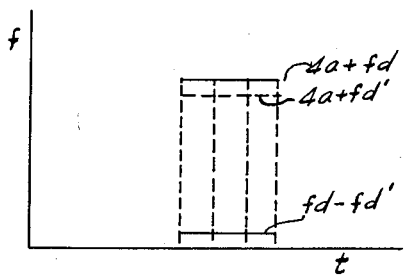
INVENTOR
Elliot L. Gruenberg
BY
Moses, Nolte, & Nolte
ATTORNEYS

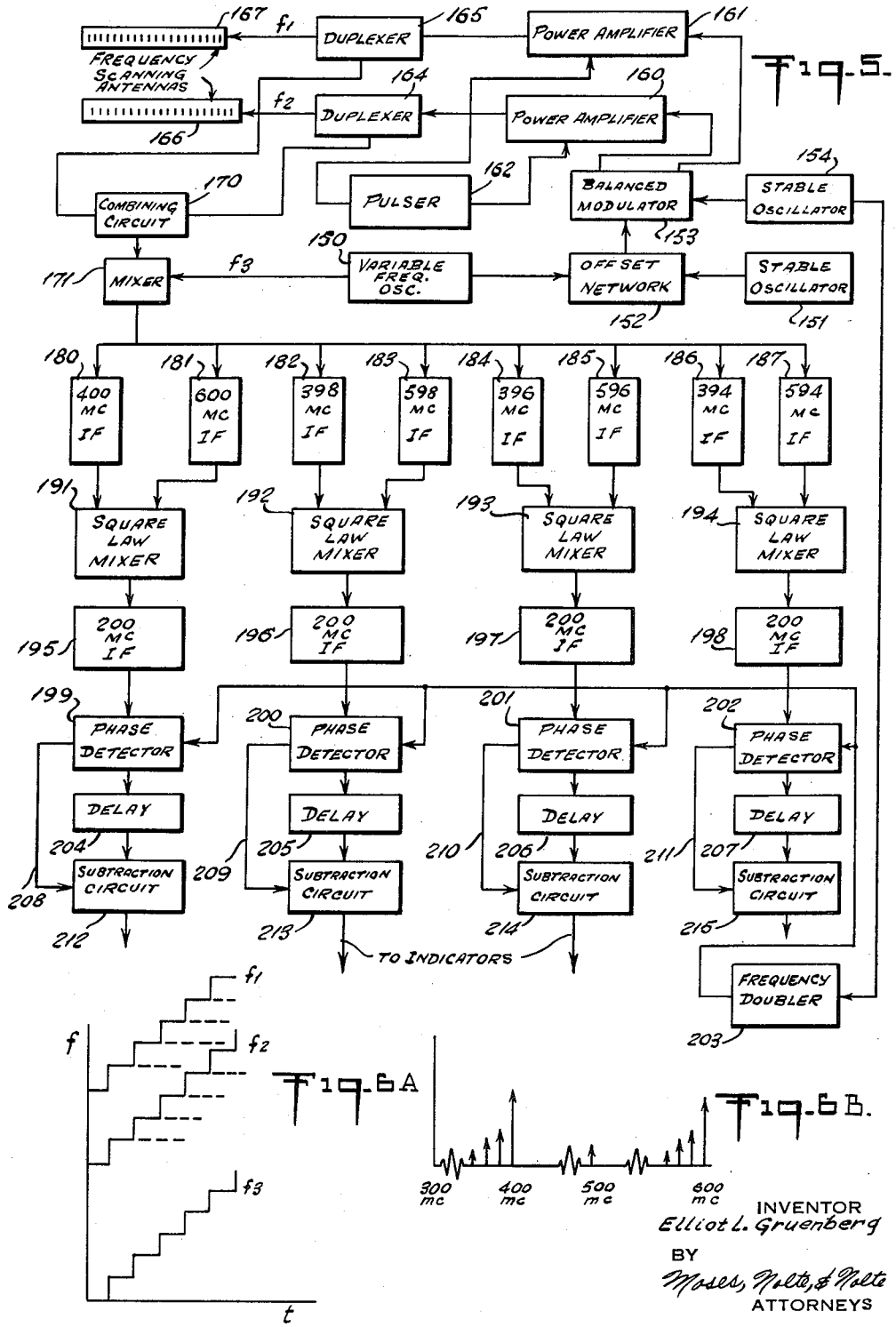

United States Patent Office 3,020,539
Patented Feb. 6, 1962

3,020,539
MODULATED CARRIER WAVE MOVING TARGET
DETECTION RADAR SYSTEM
Elliot L. Gruenberg, Brooklyn, N.Y., assignor to Maxson
Electronics Corporation, a corporation of New York
Filed Mar. 24, 1958, Ser. No. 723,239
23 Claims. (Cl. 343—7.7)

The present invention relates to a radar system, particularly a moving target indicating radar system.

In the usual moving target radar system, a pulse of microwaves is transmitted and the received pulse is heterodyned with coherent oscillations. Generally, a coherent oscillator is used which has substantially no phase shift during the interval between successive pulses. The requirement that the microwave oscillation undergo no appreciable phase shift from the time of one pulse to the next, may be very severe, particularly, when extremely short waves are used.

In some radar systems, it is desirable to vary the carrier frequency for anti-jamming purposes, or for the purpose of producing antenna scanning in response to the frequency, or for the purpose of increasing the pulse repetition frequency above the unambiguous limit, or for other reasons. The desirability of varying the carrier frequency is, of course, in direct conflict with the necessity for maintaining the carrier frequency extremely constant in the conventional moving target radar system. In the usual MTI or moving target identification radar system, any appreciable shift of the carrier frequency would mask the relatively small Doppler frequency shift which evidences the moving target. It is, therefore, a principal object of my invention to overcome this conflict by providing an MTI system, in which the carrier frequency can be varied in any desired manner.

It is another object of my invention to provide an MTI system which does not require a source of coherent oscillations.

It is still a further object of my invention to provide an MTI system which is relatively free from jamming by virtue of the fact that the carrier frequency is continually varied.

Another object of the invention is to provide an MTI system capable of tracking high velocity targets by virtue of the fact that the system utilizes a very high pulse repetition frequency and very rapid scanning.

According to one aspect of the invention, there is provided a radar transmitter for generating pulses of microwave frequency oscillations modulated by a stable oscillator so that a sub-carrier wave is superposed on the microwave oscillations. The received oscillations or echo signals are fed to a detector which demodulates the received microwave oscillations and derives the sub-carrier envelope thereof. If the echo signals have been returned by a moving target, the sub-carrier wave will be modulated at a Doppler frequency determined by the velocity of the target. The modulated sub-carrier is then compared with the output of the stable oscillator in order to determine the Doppler frequency or select the moving target echoes. Echo signals due to stationary target may be eliminated in the usual way by delaying the echo pulses for a period equal to the interval between transmitted pulses and then subtracting the delayed pulses from undelayed pulses in a manner already known in the prior art. Thereafter, the remaining echo signals, which will be only those due to moving targets, may be presented on a suitable indicator.

According to a further feature of the invention, the frequency of the carrier wave oscillations may be varied periodically, preferably in discrete steps so that successive pulses are transmitted at predetermined different frequencies. According to still another feature of the invention, the variable frequency carrier oscillations may be combined with the constant frequency sub-carrier oscillations in a balanced modulator, so that the carrier frequency is suppressed and only the two side-band frequencies are transmitted. If the sub-carrier frequency is very high, the two side-band outputs of the balanced modulator may be amplified in separate pulse power amplifiers and if necessary, transmitted by separate frequency scanning antennas adapted to scan coincidentally.

According to still another aspect of the invention, in an MTI system of the type described above, in which the carrier frequency is varied in discrete steps, the transmitter is pulsed at a frequency which is several times greater than the maximum unambiguous pulse repetition frequency and the radar receiver is provided with a plurality of I.F. channels, each of which selects echo signals from a different portion of the range.

Many other objects and advantages of my invention will be apparent to those skilled in the art from the following description and the drawings which:

FIG. 1 shows a block diagram of a Doppler frequency radar system;

FIG. 2 is a block diagram of a Doppler frequency radar system including range gating;

FIG. 3 is a block diagram of a system in which the carrier frequency is varied in discrete steps and only the two side bands are transmitted;

FIGS. 3A and 3B are graphs showing the frequency relationship of the system illustrated in FIG. 3;

FIG. 4 is a block diagram of a modification of the system shown in FIG. 3;

FIGS. 4A and 4B are frequency diagrams relating to FIG. 4;

FIG. 5 is a block diagram of a suppressed carrier moving target indicating radar system having a very high pulse repetition frequency; and FIGS. 6A and 6B are graphs showing the frequency relationships of the system illustrated in FIG. 5.

Referring to FIG. 1, a moving target indicating radar system of the kind utilizing a Doppler frequency shift, produced by a moving target, is illustrated. A transmitter 10 is provided which is capable of producing pulses of microwave oscillations which may be defined as having a wave length of less than approximately one meter. The transmitter may be of essentially conventional design except that it includes an oscillator or power amplifier which may be modulated electronically at an extremely high rate. Oscillators or power amplifiers capable of being so modulated, are well known in the art, and may consist, for example, of magnetrons, klystrons or traveling wave tubes, particularly of the carcinotron type. The microwave oscillations produced by transmitter 10 are modulated preferably in amplitude by a stable frequency oscillator 11. Oscillator 11 may be a crystal controlled oscillator, followed by suitable frequency multipliers and amplifiers. The modulation of transmitter 10 by oscillation generator 11 impresses a sub-carrier wave on the pulsed microwave oscillations. The frequency of the oscillation generator 11 will depend, as is well known, on the velocity of the targets and on the pulse repetition frequency. For very high target velocities, oscillator 11 may have a frequency of approximately 1 megacycle and for very low velocity targets, the oscillator 11 may have a much higher frequency. The modulated oscillations at the output of transmitter 10 are fed to a suitable antenna 12 which is generally directional and capable of scanning throughout a predetermined angle. Returning echo signals are received by an antenna 13 and delivered to a receiver 15. It will be understood by those skilled in the art, that although separate antennas have been indicated for transmitting and receiving, this is done merely for illustrative purposes and that, if desired, a single antenna may be used and connected to the receiver and the transmitter through suitable duplexing circuits. The receiver may include a carrier wave amplifier and a mixer circuit, providing an intermediate frequency output. The output of the receiver may be passed through three I.F. selective circuits 16–18 including amplifiers, one of the I.F. circuits 17 being tuned to the carrier frequency and the other two I.F. circuits 16, 18 being tuned to the lower and upper side bands, that is, to the frequency of the carrier wave plus and minus the frequency of oscillator 11. The outputs of I.F. circuits 16–18 are fed to detector 20, which demodulates the received oscillations and detects the sub-carrier envelope thereof. The sub-carrier wave is amplified in amplifier 22 and then combined in a mixer or phase detector 24 with the output of oscilliator 11. The frequencies of the waves fed to mixer 24 by amplifier 22 and oscillator 11 will differ only by the Doppler frequency imposed on the sub-carrier by the movement of the target. The output of mixer 24 will, therefore, be pulses having an amplitude varying in accordance with the Doppler frequency.

These pulses are then fed through a suitable delay circuit 26 to a subtraction circuit 27 wherein they are combined with undelayed pulses fed over a connection 28. The delay produced by circuit 26 is equal to the pulse repetition period. Subtraction circuit 27, as is well known, subtracts each delayed pulse from the next received echo pulse from the same target. Hence, pulses returned by a stationary target are cancelled out and only echo pulses from moving targets appear at the output of the subtraction circuit and are fed to an indicator 30. Indicator 30 may be an oscilloscope having a P.P.I. scan or any other suitable type of scan, such as, for example B-type scan.

It will be recognized by those skilled in the art, that the system illustrated in FIG. 1 and described above avoids the necessity of maintaining the carrier frequency substantially constant and does not require the generation of coherent oscillations. In fact, the carrier frequency may vary over relatively wide limits without affecting the accuracy of the target velocity measurements. Since oscillator 11 has an extremely stable frequency, target velocities may be measured with very great accuracy and even a very small target velocity may be accurately measured. The system, therefore, has an enormous advantage over the conventional coherent oscillator MTI system.

FIG. 2 illustrates another embodiment of the invention which is highly immune to jamming by virtue of the fact that the carrier frequency is varied. A main pulse generator 40 supplies pulses at a desired repetition frequency over a line 41 to pulse modulator 42, which is also provided with constant frequency oscillations from stable oscillator 43. For the sake of definiteness, let it be assumed that oscillator 43 has a frequency of 30 megacycles. The output of pulse modulator 42 will then be pulses of 30 megacycle oscillations and these are fed to the accelerating electrode of a carcinotron circuit 45, such as a pulsed power carcinotron. An alternative to the carcinotron circuit may be a power amplifier preceded by a suitable oscillator, such as a low power carcinotron oscillator or backward wave oscillator. In any event, the pulses impressed on the accelerating electrode of the oscillator will vary the amplitude of the carrier oscillations produced thereby in accordance with the instantaneous amplitude of the pulsed oscillations at the output of pulse modulator 42. Pulse generator 40 also pulses generator 46 which produces a pulse having a variable amplitude in response to each pulse impressed thereon by pulse generator 40. Voltage generator 46 may be any type of circuit capable of producing pulses having an amplitude varying in a more or less irregular manner. The voltage pulses from generator 46 are fed to a suitable pulse shaping circuit 48 which supplies a varying voltage to the "sole" electrode of the carcinotron oscillator 45. Circuits 46 and 48 may be of the type shown in FIGS. 4 and 5 of application Serial No. 602,998, filed August 9, 1956. The output of carcinotron circuit 45 is fed through a suitable duplexer 49 to an antenna 50.

Echo signals received by antenna 50 are fed through duplexer 49 to a receiver which may include a mixer 60. In mixer 60 the received oscillations are heterodyned by an oscillator 61 which may be a low power carcinotron. A carcinotron is preferred for oscillator 61 since it is desirable to vary the frequency thereof, substantially in accordance with the frequency of the transmitted oscillation. For this purpose, a coupling 63 abstracts a small amount of the transmitted power and supplies it to a mixer 64 to which also the output of oscillator 61 is fed. The output of mixer 64 is fed through a tuned I.F. channel 65 to frequency discriminator 66. The output of discriminator 66 is fed to a lock-on sweep circuit 67 which is connected to the frequency controlling electrode of carcinotron 61 in order to vary the frequency of this oscillator in accordance with the frequency of the transmitted oscillations. Circuits 65–67 constitute an automatic frequency control circuit which maintains the frequency of oscillator 61 spaced from the frequency of the transmitted oscillations by an amount corresponding approximately to the frequency of I.F. circuit 65. Any other suitable A.F.C. circuits may be used.

This output of mixer 60 will, therefore, be an I.F. frequency substantially equal to that of I.F. circuit 65 and this output may be fed through three parallel I.F. channels 70, 71 and 72 which are tuned to the I.F. carrier frequency and the two side-band frequencies which are spaced above and below the carrier frequency by 30 megacycles. I.F. channels 70, 71 and 72 may be rather sharply tuned, that is, they may have a band width only wide enough to accommodate the pulse spectrum; a band width of 10 megacycles being sufficient for a 0.1 microsecond pulse. The I.F. channels thereby provide a high degree of discrimination against interfering signals. The outputs of the I.F. channels are combined in a detector 73 which detects the 30 megacycle sub-carrier envelope. The sub-carrier envelope is then fed through a second I.F. channel including a suitable number of amplifiers 74 to a range gate circuit 75. Range gate circuit 75 is controlled by pulse generator 76 which in turn, is controlled by the main pulse generator 40 through a suitable phasing or delay device 78. As is well known, the phasing device 78 is a variable phasing or delay device which may be adjusted to produce a delay corresponding to the range of the target which is being gated. The adjustment of phasing device 78 is, therefore, a measure of the range of the desired target and, therefore, its output may be fed over a connection 79 to a range indicator. It will be clear then, that range gate 75 will be opened only when echo signals from the desired target are being received. These echoes are fed to a mixer 80 where they are combined with the output of the stable sub-carrier oscillator 43, which is connected to mixer 80 over a line 81. The output of mixer 80 will then be echo pulses from the desired target modulated in amplitude in accordance with the Doppler frequency produced by that target. The pulses from mixer 60 may then be passed through a narrow band filter and integrator 83 to a moving target velocity indicator 85 of the oscilloscope type, or any other type.

It will be understood that the system described in FIG. 2 is subject to many variations. The 30 megacycle frequency of oscillator 43 has merely been given as an example, and it may have widely differing values. Furthermore, the mixer 60 and the circuits 61–67 associated therewith as well as the I.F. channels 70, 71 and 72 may be dispensed with and the received oscillations may be fed through any suitable receiver to the detector 73. An outstanding feature of the system is its ability to operate with a variable carrier frequency without impairing the reception and accurate measurement of the Doppler shift.

frequency, thus providing considerable immunity to jamming.

FIG. 3 shows another Doppler frequency radar system in which the carrier frequency is applied by a variable oscillator 100, the frequency of which is varied in steps throughout a given frequency range by a step or staircase voltage generator 101. Various circuits for obtaining stepped voltages are known in the art. The output of oscillator 100 is fed to a balanced modulator 102 to which there is also supplied a frequency $f_m$ from a stable oscillator 105. The balanced modulator combines the frequency $f_c$ and $f_m$ to produce a pair of side-band frequencies $fT_1$, $fT_2$ while the carrier frequency $f_c$ is suppressed. The side-band frequencies are amplified preferably by a pair of power amplifiers 106 and 107 which are modulated by a pulse modulator 108. Pulse modulator 108 also has a connection 109 to step generator 101 to synchronize the latter with the transmitted pulses. The outputs of power amplifiers 106 and 107 are fed through duplexers 110 and 111 to a pair of frequency scanning antennas 112 and 113. These antennas may be of the type consisting of a linear ray of radiators arranged so that their directivity varies in accordance with the frequency of the oscillation impressed thereon.

Antennas 112 and 113 are also connected through duplexers 110 and 111 to a receiver which includes a combining or summing circuit 115, the outputs of which consist of the two side-bands $fT1$ and $fT2$. These sidebands are combined in mixer 116 with the output of variable oscillator 100 which supplies the carrier frequency over a connection 117 to the mixer. The output of mixer 116 is tuned to select the sub-carrier frequency $f_m$ which includes the Doppler shift.

After passing through an intermediate frequency amplifier 120, the output frequencies of mixer 116 are combined in a mixer or detector 121. The output of mixer 121 will, therefore, be echo pulses modulated by the Doppler frequency and these pulses are supplied to a subtraction circuit 125 through a delay device 123 and a direct connection 124. As previously explained, subtraction circuit 125 will eliminate echo pulses from stationary targets and pass the echo pulses from moving targets to a suitable indicator 126 adapted to display these echo pulses or indicate the Doppler frequency and thereby measure the radial component of the velocity of a target.

The frequency relations in the system of FIG. 3 are illustrated in FIGS. 3A and 3B. The curve marked $f_c$ shows the step frequency of variable oscillator 100. The frequency of constant frequency oscillator 105 is indicated by $f_m$ so that when the output of these two oscillations are combined in balanced modulator 102, they produce the two side-band step frequencies $fT1$ and $fT2$, which may include Doppler frequency shifts $fd$ and $fd'$ in the same direction to a higher frequency, for example. During each frequency step, at least one pulse may be transmitted. It will be seen, therefore, that each pulse is transmitted at a substantially fixed frequency and the frequencies of successive pulses differ by discrete preferably equal amounts. The output of mixer 116 resulting from mixing $fc$ with the received side bands is shown in FIG. 3B. The frequency output of this mixer comprises frequencies $fm+fd$ and $fm-fd'$ indicated by lines 130 and 131. When these two frequencies are mixed in detector 121, the beat between $fd$ and $fd'$ occurs, which beat is the Doppler frequency relating to $fm$, the fixed frequency, and which will not vary with variations in $fc$. After pulses from stationary targets are eliminated in the subtraction circuit, the pulses from any desired target may be integrated to provide a direct voltage having the Doppler frequency envelope, the frequency of which may be indicated or measured by means which are well known. If more than one moving target is present, the velocity of any desired target may be determined by using the well-known gating techniques of this art, as indicated in FIG. 2.

FIG. 4 shows a system having a transmitting portion essentially like that of FIG. 3, and, accordingly, the elements of the transmitting portion have been given the same reference numerals as in FIG. 3. The description of the transmitter will not be repeated. The received signals from duplexers 110 and 111 are fed to mixers 116a and 116b where they are combined with the frequencies $fT1$ and $fT2$ respectively. If the return signals are from a target within a range zone such that during the travel of these signals frequencies $fT1$ and $fT2$ have changed by one step, the output frequency of mixers 116a and 116b will be equal to $A+fd$ and $A+fd'$, where A is the frequency of one step of oscillator 100 and $fd$, $fd'$ are Doppler frequencies. If the target is at a greater range such that the frequencies $fT1$ and $fT2$ undergo two steps before the echo is received, the output frequencies of mixers 116a and 116b will be $2A+fd$ and $2A+fd'$. In general, then the echoes of targets in different range zones will produce output signals from mixers 116a and 116b which have frequencies $nA+fd$ and $nA+fd'$ where $n$ is the number of the range zone. These outputs are fed to a combining or coupling circuit 115 and from this circuit are supplied to a plurality of filters 120a to 120n which may be narrow band pass filters, each adapted to pass the frequencies resulting from targets in one range zone. The outputs of these filters are fed to square low detectors or mixers 121a–121n from which the difference frequencies $fd-fd'$ are obtained and supplied to narrow band Doppler filters 130a–130n tuned to frequencies within the Doppler frequency band $fd-fd'$. Thus, the filters 130a will receive the Doppler frequencies of targets in one range zone. Filters 130b will receive the Doppler frequencies from targets in the next range zone, etc. In each range zone channel a number of filters 130a, 130a', etc. may be connected in parallel and adjusted so that together they cover the required Doppler band. This enables a number of targets in each range zone to be handled simultaneously. The outputs of the Doppler filters 130 may then be impressed on any suitable subtraction circuit and/or indicator as in FIG. 3.

In FIG. 4A there is shown a graph of the two stepped side-band frequencies $fT1$ and $fT2$. The steps preferably have a constant frequency difference A. The stepped carrier frequency of oscillator 100 is shown at $Fc$. The received echoes will occur at frequencies 134 and 135 having Doppler shifts $fd$ and $fd'$ as shown in FIG. 4A. As shown in FIG. 4A, these echoes would originate from the fourth range zone, and it is assumed that the target has been hit three times and has returned three echoes, in other words, that the beam is wide enough so that the target will be intercepted during three angular shifts of the radiated beam during three frequency steps. FIG. 4B shows that in the fourth range zone, three signals will be received having frequencies $4a+fd$ and $4a+fd'$ ($fd$ and $fd'$ may be negative, as in FIG. 4A). These two frequencies will then be combined in one of the detectors 121 and produce resultant frequency $fd-fd'$, which will then pass through the appropriate Doppler filter 130 of the fourth range zone channel to a suitable indicator. The plurality of filters 130a, 130b, etc. in each range zone channel may have frequencies spaced throughout the frequency band.

FIG. 5 shows another system according to the invention which is capable of utilizing a very high pulse repetition frequency. A variable frequency oscillator 150 produces a stepped frequency carrier wave $f_3$ as indicated in FIG. 6A. This oscillator may conveniently consist of a carcinotron oscillator to the sole electrode of which a step voltage generator is connected. The output oscillator 150 is combined with the output of stable oscillator 151 in an offset network 152 which may, for example, be a mixer. For convenience of discussion, it will be assumed that oscillator 151 operates at 500 megacycles. The output of offset network 152 is combined in balanced modulator 153 with the oscillations supplied by a stable oscillator 154 which will be assumed to have a frequency of 100 megacycles. Thus, the carrier frequency produced by offset network 152 will be suppressed and two side bands spaced therefrom by 100 megacycles will be fed by balanced modulator 153 to a pair of power amplifiers 160 and 161. These power amplifiers may conveniently be carcinotron amplifiers and they are pulsed by a pulser circuit or pulse modulator 162. The pulsed side-band output of the power amplifiers are fed through duplexers 164 and 165 to a pair of antennas 166 and 167 which are adjusted to the side-band frequencies $f_1$ and $f_2$ and may consist of linear arrays of radiators so that the antennas are adapted to scan in response to the frequency of the oscillations fed thereto.

The maximum range over which the system is adapted to operate determines a time T required for the pulses to travel back and forth over this maximum range. As is wellknown, the pulse repetition period must be greater than the period T, otherwise an echo received from a distant target in response to one transmitted pulse may arrive at the receiver at the same time as an echo resulting from a near target reflection of a following pulse. The receiver, therefore, in the usual system, would have no way of distinguishing or determining whether a particular echo signal is due to a near target or far target, in other words, the range would become indeterminant or ambiguous in the sense that any particular echo signal might be due to targets at different ranges. Consequently, it is necessary in known systems, to keep the pulse repetition period at least equal to the maximum travel time of a pulse to and from targets at the maximum useful range. This required minimum pulse repetition period is called the unambiguous pulse repetition period and the corresponding pulse repetition frequency is called the unambiguous pulse repetition frequency.

In the system shown in FIG. 5, as was the case in the system shown in FIG. 3, the maximum range is divided into $n$ zones and the pulse repetition frequency is made $n$ times greater than the unambiguous pulse repetition frequency. The enormous advantages of doing this will be self-evident to those skilled in the art. We need only mention, for example, the increased capability of the system to track high velocity targets and the much greater permissible scanning speeds of the antenna to make evident the magnitude of the advantages which are gained by making the pulse repetition frequency of pulser 152 equal to $n$ times the unambiguous rate. Of course, to make this possible, the receiver must be capable of determining the range of any target even though it may be receiving echo signals simultaneously from targets at different ranges.

The receiver consists of a combining or summing circuit 170 which is connected to antennas 166 and 167 through the duplexers 164 and 165. The summing circuit combines oscillations of frequencies $f_1$ and $f_2$ and supplies them to a mixer 171 which is connected to the oscillator 150. Assuming that the frequency steps of frequency $f_3$ oscillator 150 are each equal to 2 megacycles, the output of mixer 171 will be 400 megacycles and 600 megacycles for echo signals received from zone 1, that is the nearest zone, and will be 398 megacycles and 598 megacycles for echoes from the second zone, 396 megacycles and 596 megacycles for echoes from the third zone, 394 megacycles and 594 megacycles for echoes from the fourth zone, etc. The frequency spectrum at the output of mixer 171 is shown in FIG. 6B. It can be seen that the spectrum will be centered about 500 megacycles which is the frequency of oscillator 151. The two side bands are spaced 200 megacycles apart and each side band will include frequencies which are spaced 2 megacycles apart by virtue of the fact that the signals from each zone are heterodyned by a frequency $f_3$ which differs from the frequency of the received echo signals by $n$ frequency steps. The side bands corresponding to zone 1 are selected and may be amplified in I.F. channels 180 and 181 and the side bands corresponding to the second, third and fourth zones, etc. are selected and amplified by I.F. channels 182–187, etc. Each pair of side bands is impressed on mixers or detectors 191 to 194. The mixers may be square-law devices producing an output which has a frequency difference between a pair of side bands, namly 200 megacycles. The outputs of the mixers are selected and amplified in I.F. channels 195 to 198 and impressed on phase detectors 199–202, wherein they are combined with a 200-megacycle oscillation provided by oscillator 154 and frequency doubler 203. The output of the phase detectors will be pulses modulated in amplitude at the Doppler frequencies. These pulses may then be fed through delay devices 204–207 and connections 208–211 to subtraction circuit 212–215 which cancel out pulses due to stationary targets and leave only pulses produced by moving targets. The pulses at the output of each subtraction circuit will be those produced by targets in one zone of the range. The subtraction circuits may be individually connected to suitable indicators for displaying the targets in each zone and as it well known in the art, the display units may be of the type which can present and measure the Doppler frequencies in order to indicate the velocity of the targets. For the sake of simplicity, various refinements which may be used, such as integrators, range gating circuits, etc., are omitted from the schematic circuit of FIG. 5.

Having described my invention, what I claim and desire to secure by Letters Patent is:

1. A moving target detecting radar system comprising constant frequency oscillation producing means, a transmitter means connected thereto for producing pulses of microwave carrier oscillations modulated by a subcarrier consisting of said constant frequency oscillations, means for receiving echoes of said microwave oscillations, means for demodulating the received oscillations and deriving therefrom said subcarrier, which may have Doppler effect frequency variations due to reflection from moving targets, mixer means connected to the output of the demodulator means and the constant frequency oscillation producing means for producing echo pulses, and means conneced to said mixer means for indicating pulses due to a moving target.

2. A radar system according to claim 1, wherein the receiving means includes means for eliminating pulses received from stationary targets.

3. A radar system according to claim 1, wherein said transmitter includes a variable frequency oscillator means for varying the frequency of the carrier oscillations.

4. A radar system according to claim 3, wherein said last means includes means for changing the frequency of the carrier oscillations by a given amount from one pulse to the next.

5. A radar system according to claim 3, wherein said last means includes means for changing the frequency of the carrier oscillations in discrete steps.

6. A radar system according to claim 3, wherein the radiating means and the receiving means includes antenna means for scanning angularly in response to the frequecy of the carrier oscillations.

7. A radar system according to claim 3, wherein the transmitter means includes balanced modulator means for producing suppressed carrier oscillations having side-band frequencies equal, respectively, to the sum of and the difference between the frequencies of the carrier oscillations and the constant frequency oscillations.

8. A radar system according to claim 7, wherein the radiating means includes a separate antenna for each side-band frequency and means connecting the balanced modulator to the antennas for supplying each antenna with oscillations of one of said side-band frequencies.

9. A system according to claim 3, wherein said oscillator means varies the frequency of the carrier oscillations randomly.

10. A radar system according to claim 3, wherein said receiving means includes a mixer preceding said demodulating means, said mixer being connected to the variable frequency oscillator means for combining the output thereof with the received oscillations to supply intermediate frequency oscillations to said demodulator means.

11. A moving target indicating radar system comprising means for producing pulses of microwave oscillations, means for varying the frequency of said oscillations periodically over a given frequency band, means for modulating said oscillation with sub-carrier frequency oscillations, the operating distance range of the system being divided in to $n$ zones, where $n$ is greater than one, means in the transmitter for causing the pulses of microwave oscillations to have a repetition period equal to $$\frac{T}{n}$$

where T is the total round-trip travel time of an electromagnetic wave reflected from a target at the maximum distance of said operating range, and receiver, a demodulator in said receiver for detecting said sub-carrier frequency oscillations, means connected to said demodulating means for selectively receiving echoes signals from any one of said range zones and means connected to said last means for indicating the pulses received from a moving target.

12. A system according to claim 11, including means for varying the frequency of the microwave oscillations in discrete steps.

13. A system according to claim 12, including means for eliminating pulses received from stationary targets, said last-named means including means for delaying received pulses for a time equal to the interval between successive adjacent pulses, and means for combining the received delayed pulses with undelayed received pulses.

14. A system according to claim 12, including transmitting and receiving antenna means for scanning angularly in response to the frequency of the microwave oscillations.

15. A moving target radar system comprising constant radio frequency sinusoidal oscillation producing means, a transmitter means connected thereto for producing pulses of microwave carrier oscillations modulated by said constant frequency oscillations, means for radiating two side bands of said modulated microwave oscillations, means for receiving echoes of said radiated microwave oscillations, means for separately heterodyning each side band of the received oscillations with a continuous wave side band of the modulated carrier oscillations of the transmitter and deriving therefrom oscillations having Doppler frequency components $fd$ and $fd'$ corresponding to the two radiated side bands, and detector means connected to the heterodyning means for deriving oscillations having a frequency equal to $fd-fd'$.

16. A radar system according to claim 15, wherein said transmitter includes variable frequency oscillator means for varying the frequency of the carrier oscillations in discrete substantially uniform steps at a rate equal to the pulse repetition frequency.

17. A radar system according to claim 16, wherein the range is divided into $n$ equal zones and the pulse repetition period is substantially equal to the round-trip travel time of electromagnetic waves through one of said zones, including a separate frequency selective channel for the signals from each range zone connected to the output of the heterodyning means.

18. A radar system according to claim 16, wherein the radiating means and the receiving means includes antenna means for scanning angularly in response to the frequency of the carrier oscillations.

19. A radar system according to claim 16, wherein the transmitter means includes balanced modulator means for producing suppressed carrier oscillations having two sideband frequencies equal, respectively, to the sum of and the difference between the frequencies of the carrier oscillations and the constant frequency oscillations.

20. A moving target radar system comprising means for producing constant radio frequency sinusoidal oscillations, a transmitter means connected thereto for producing microwave carrier oscillations modulated by said constant frequency oscillations, means for radiating two side bands of said modulated microwave oscillations, means for receiving echoes of said radiated microwave oscillations, said receiving means including means for separately heterodyning each side band of the received oscillations with a continuous wave side band of the modulated carrier oscillations of the transmitter and deriving therefrom oscillations having Doppler frequency components $fd$ and $fd'$ corresponding to the two radiated side bands, and detector means connected to the heterodyning means for deriving oscillations having a frequency equal to $fd-fd'$, said transmitter including variable frequency oscillator means for varying the frequency of the carrier oscillations in discrete substantially equal steps, the range being divided into $n$ equal zones and the period of the steps being substantially equal to the round-trip travel time of electromagnetic waves through one of said zones, the receiving means including a separate receiving channel for each range zone connected to the output of the heterodyning means, the radiating means and the receiving means including antenna means for scanning angularly in response to the frequency of the carrier oscillations.

21. A radar system comprising means for producing constant radio frequency oscillations, transmitter means connected thereto for producing pulses of microwave carrier oscillations modulated by said constant frequency oscillations, means for receiving echoes of said microwave oscillation, whereby echoes of said microwave oscillation reflected by a moving object include Doppler frequency variations of said constant frequency modulation of said microwave oscillations, said receiving means including means for demodulating the received carrier oscillations and deriving therefrom oscillations having a frequency corresponding to said constant frequency oscillations, and means connected to said demodulating means for indicating said Doppler frequency variations.

22. A moving target detection radar system comprising transmitter means for producing pulses of microwave carrier oscillations, means for producing constant radio frequency sinusoidal oscillations having a low frequency relative to said microwave carrier oscillations, said transmitter means including means for modulating said microwave oscillations with said constant radio frequency oscillations, means for radiating said microwave oscillations, means for receiving echoes of said radiated oscillations, said receiving means including means for demodulating the received carrier oscillations and detecting the constant radio frequency oscillations, and means for detecting and indicating Doppler frequency modulations of said constant radio frequency oscillations produced by reflections of the carrier oscillations by moving targets.

23. A moving target radar system according to claim 22, wherein said transmitter means includes means for continually varying the frequency of said carrier oscillations.

References Cited in the file of this patent

UNITED STATES PATENTS

| | | |
|---|---|---|
| 2,479,568 | Hansen | Aug. 23, 1943 |
| 2,543,449 | Emslie | Feb. 27, 1951 |